Oct. 20, 1942.  E. G. HALLQUIST  2,299,576
RAILWAY VEHICLE STRUCTURE
Filed March 8, 1940  2 Sheets-Sheet 1
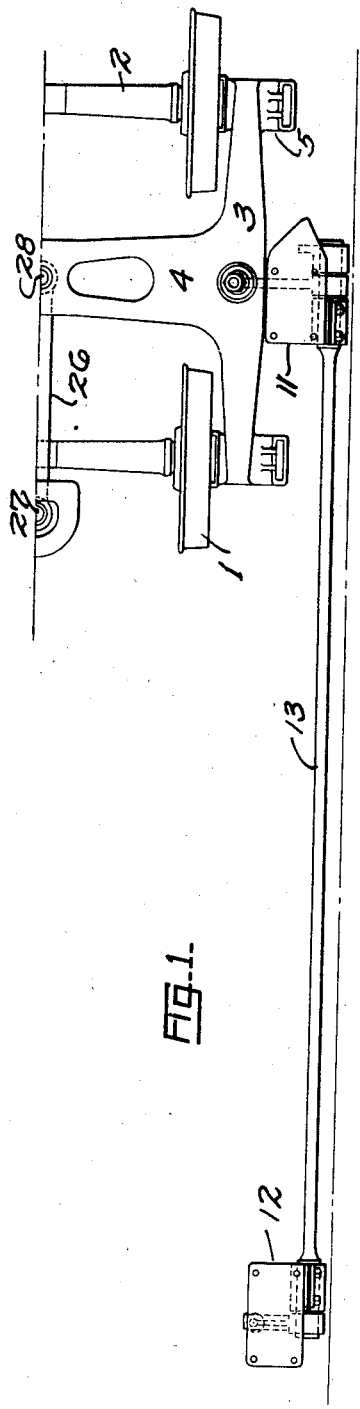
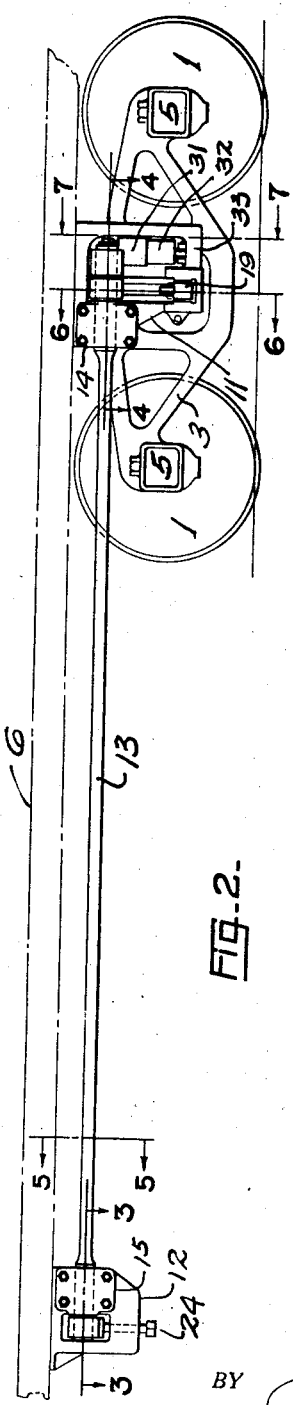
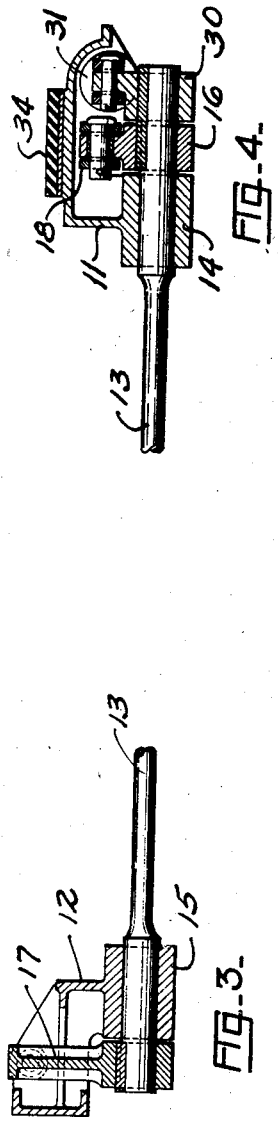
INVENTOR:
EINAR G. HALLQUIST
BY Rodney Bedell
ATTORNEY Oct. 20, 1942.  E. G. HALLQUIST  2,299,576
RAILWAY VEHICLE STRUCTURE
Filed March 8, 1940  2 Sheets-Sheet 2

INVENTOR:
EINAR G. HALLQUIST
BY Rodney Bedell
ATTORNEY

Patented Oct. 20, 1942

2,299,576

UNITED STATES PATENT OFFICE 2,299,576

RAILWAY VEHICLE STRUCTURE

Einar G. Hallquist, Wallingford, Pa., assignor to General Steel Castings Corporation, Granite City, Ill., a corporation of Delaware Application March 8, 1940, Serial No. 322,904

13 Claims. (Cl. 105—171)

The invention relates to railway rolling stock and consists in a structure for yieldingly supporting a vehicle body upon a separately formed truck. It has been customary to provide springs between the truck axle journal boxes and the truck frame and to provide additional springs between the truck frame and the truck bolster and to support the vehicle body directly upon the truck bolster at the longitudinal center line of the vehicle. This general arrangement necessitates a substantial vertical distance between the journal boxes and the truck frame and vehicle body, and the vehicle is inclined to roll from side to side because its main support is at its center. To reduce the transmission of lateral thrusts against the wheel to the vehicle body, it has been customary to provide the truck with lateral motion bolsters carried on the truck frame by means of swing hangers, rockers, rollers or similar devices, and this requires additional parts and, in some instances, additional height from the rail to the body supporting portion of the truck bolster. In many such structures lateral thrusts are delivered to the truck springs making it necessary to construct the latter to resist lateral forces as well as vertical forces which they are intended primarily to absorb.

One of the objects of the present invention is to reduce the height of the truck and keep the center of gravity of the railway vehicle as low as possible and at the same time provide sufficient clearance between the truck and the vehicle body to permit vertical, lateral, and swiveling movements of the truck relative to the car body.

Another object of the invention is to support the vehicle body at the sides thereof, rather than at the center, and thereby more effectively control or reduce the extent of the undesirable rolling action mentioned above.

Another object of the invention is to provide a construction which utilizes straight rods comprising torsion springs to resiliently support the vehicle body upon the truck parts or axles and thereby provide a much simpler spring arrangement than the usual coil or elliptic springs which carry the vertical loading.

Another object of the invention is to eliminate the direct application of lateral thrusts to the springs, leaving them free to perform their intended function of yieldingly supporting the vehicle.

Another object is to use the springs to yieldingly resist lateral motion of the truck and body but without interfering with the normal functioning of the spring to yieldingly support the body and without placing the spring under abnormal strains because of the additional functioning.

Another object of the invention is to provide for lateral motion of the truck and body without complicating the truck structure to the extent required in the usual lateral motion bolster truck.

These and other detail objects are attained by the structure illustrated in the accompanying drawings in which—

Figure 1 is a top view of a four-wheel truck and a torque rod spring structure for supporting the vehicle body from the truck.

Figure 2 is a side elevation of the structure shown in Figure 1 and also indicates a portion of the vehicle body.

Figures 3 and 4 are detailed horizontal sections taken on the lines 3—3 and 4—4, respectively, of Figure 2 and drawn to an enlarged scale.

Figure 6:
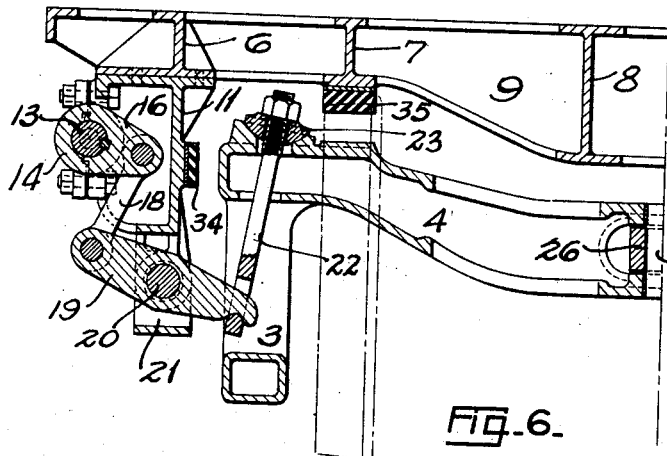
Figure 5:
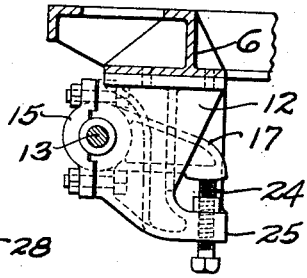
Figure 7:
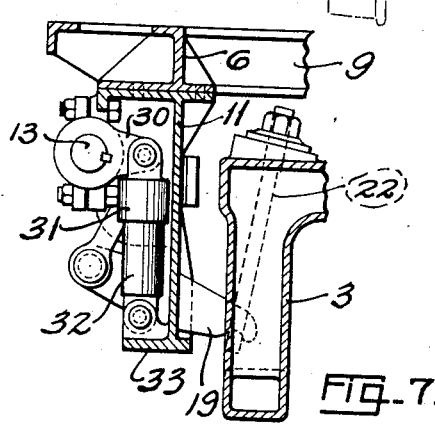

Figures 5, 6 and 7 are vertical transverse sections taken on the corresponding section lines of Figure 2 and drawn to an enlarged scale.

Figure 8:
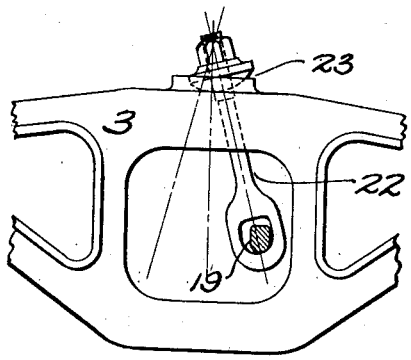

Figure 8 is a side elevation of the truck frame with its body supporting swing hanger moved to an extreme position.

Figure 9:
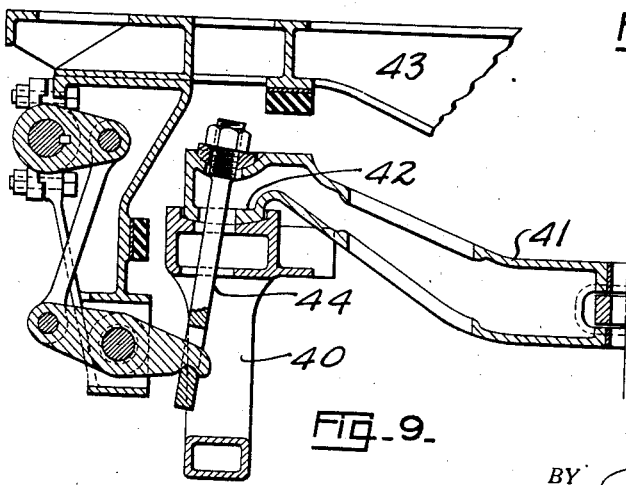

Figure 9 corresponds to Figure 6 but illustrates another form of the invention.

The vehicle truck includes the usual wheels 1 and axles 2 mounting a truck frame including wheel pieces 3 and a cross transom or bolster 4. The truck frame is shown with integral journal boxes 5.

The vehicle body underframe includes longitudinal sill members 6, 7 and 8 and transverse transoms, one of which, indicated at 9, extends over the truck, and others, not shown, are located at substantial distances from the bolster. Brackets 11 and 12 are secured to the bottom of frame 6 adjacent to the truck and at a point spaced substantially from the truck, and each bracket depends from the body frame and forms a bearing for an elongated torque rod 13, the bearings being completed by suitable caps 14 and 15, respectively. The ends of rod 13 are provided with crank arms 16 and 17, respectively. The end of crank arm 16 is connected by a link 18 with the outer end of an equalizer 19 pivoted at 20 on a stirrup 21 depending from bracket 11 and having its inner end carried by swing hanger link 22 pivotally suspended from the truck frame by a ball and socket bearing 23.

Arm 17 on the other end of rod 13 bears against an adjustable stop 24 carried by the lower portion 25 of bracket 12.

A horizontal bar 26 is pivoted to the car body at 27 and to the truck transom at 28 and provides for swiveling of the truck and body relative to each other, and also provides for their relative lateral movement.

Rod 13 forms a spring suspension for the car body on the truck and any vertical forces, due to track irregularities or other conditions which would tend to increase or decrease the torsional resistance of the rod, cause the crank arm 16 to have an angular movement in a vertical plane. Arm 17 at the other end of the rod is held against screw 24 by the weight of the car, but by adjusting the screw in its carrier 25, the height of the car body may be adjusted. The pivotal connections between swing hanger 22 and the truck frame and equalizer 19 are the universal type so as to permit free swivel action of these parts. That is, the truck frame may move laterally of the body either at right angles to the longitudinal center line of the vehicle or at an angle as when the car is rounding a curve, in which latter case the swing hanger will assume the position shown in Figure 8 which makes it possible for equalizer 19 to remain in the same vertical plane extending transversely of the vehicle. Since any movement of the swing hangers from their normal angular positions, as indicated in Figure 6, will result in pivotal movements of the equalizers 19, it is obvious that the torque rods 13 act to resist movement of the truck laterally and pivotally of the body, and therefore the springs cooperate with the inclined swing hanger to center the truck relative to the body.

It may be desired to snub the spring action of rod 13 and to this end the same is extended past equalizer 19 and provided with an arm 30 connected to the upper member 31 of a telescoping shock absorber, the lower member 32 of which is connected to an extension 33 on bracket 11. The shock absorber is of the type comprising a piston operable in a fluid filled dash-pot and valved to permit comparatively free relative movement in one direction of the parts to which it is attached while resisting rapid relative movement of the parts in the opposite direction. Accordingly, when the car rides over a track irregularity, tending to raise the truck, and rod 13 flexes to absorb the blow, the shock absorber 31 and 32 will offer little or no resistance to the relative movement of the truck and body, but when the blow has been absorbed and rod 13 tensed to return to its normal position, then shock absorber 31 and 32 acts to snub the return action and thereby dampen and control the vibrations to prevent bouncing, resulting in better riding quality for the vehicle.

Rubber pads 34 and 35 on the car body oppose portions of the truck frame to limit relative vertical and transverse movements of the body and truck.

Figure 9 illustrates another form of the invention in which the truck frame 40 and transom 41 are formed separately and the transom has a ball and socket bearing 42 on the frame. This arrangement provides for pivotal action both vertically and horizontally between the frame and transom and contributes to the flexibility of the truck. The car body 43 is carried by swing hangers 44 pivotally suspended from the truck transom similar to the swing hanger 22 previously described.

Other variations in the details of construction may be made without departing from the spirit of the invention, and the exclusive use of all modifications coming within the scope of the claims is contemplated.

What is claimed is:

1. In a railway vehicle, a body member, a truck member, said members being relatively movable vertically and laterally and means supporting said body member on said truck member comprising a torque rod positioned beneath said body and having one portion secured against rotation relative to one of said members and another portion spaced therefrom journalled on said latter member, and a linkage connection between said rod and the other of said members adjacent to the journalling of said rod whereby the resistance of said rod to torsional forces resists relative vertical movement of said members while their relative lateral movement is accommodated by said linkage.

2. In a railway vehicle, a body underframe member, a truck frame member, means supporting said body member on said truck member comprising a torque rod extending horizontally at the level of said truck frame member and having spaced portions journalled on one of said members at said level, and arms on said portions connected to said members respectively, one of said arms holding the adjacent portion of the rod against movement relative to said body member and the other of said arms being supported by said truck member.

3. A railway vehicle as described in claim 2 in which the support of one arm from the truck member is constructed and arranged to accommodate lateral movement of the truck member relative to the body member.

4. In a railway vehicle, a body including an underframe, a swiveling truck therefor including a frame pivotally connected to said underframe, and means supporting said body on said truck comprising a torque rod extending horizontally at the level of said underframe and truck frame having spaced portions secured to said body underframe and to said truck frame respectively, the means securing one of said portions being arranged to accommodate swiveling movement of said truck relative to said body.

5. In a railway vehicle, a body, a truck including a frame, a swing hanger suspended from said frame, a torque rod having one portion secured to said body and another portion journalled on said body, there being a crank arm near said latter mentioned portion, and a connection between the end of said crank arm and said swing hanger whereby said body is supported on said truck through said rod, connection and hanger and is movable vertically relative to said truck by the yielding of said rod to torsional forces, and is movable transversely of the truck by the swinging of said hanger.

6. A railway vehicle as described in claim 5 which also includes a snubbing device between the body and the truck for dampening the spring action of the torque rod.

7. In a railway vehicle, a body, a truck including a frame, a torque rod extending horizontally at substantially the same level as said frame and having spaced portions journalled on said body, an equalizer pivoted on said body adjacent to and below one of said rod portions, a crank arm on said rod, a link between the end of said crank arm and one end of said equalizer, the other end of said equalizer being connected to said truck frame and the other end of said rod being secured against rotation relative to said body whereby said body is yieldingly supported on said truck by the resistance of said rod to torsional forces.

8. A vehicle as described in claim 7 in which the connection between the equalizer and the truck comprises a hanger pivoted on the truck frame to swing transversely and longitudinally of the vehicle.

9. In a railway vehicle, a body, a truck having a swivel connection to said body, a torque rod extending along the side of said body with a crank arm at one end abreast of said swivel connection, an equalizer pivoted on said body adjacent to said crank arm, a connection between one end of said equalizer and said crank arm and a swing hanger connection between the other end of said equalizer and said truck, the opposite end of said rod being held against rotation relative to said body, said rod, equalizer and connections yieldingly supporting said body on said truck and accommodating swiveling movement of said truck relative to said body.

10. In a railway vehicle truck, side frames with hollow wheel pieces, a transom extending between and provided with ball and socket bearings on said wheel pieces, and body supporting swing hangers with their upper ends pivotally suspended from said transom and extending downwardly through said ball and socket bearings and hollow wheel pieces.

11. In a railway vehicle, a truck including side frames with hollow wheel pieces, a transom extending between and provided with ball and socket bearings on said wheel pieces, a body having depending brackets at the outer sides of said wheel pieces, and swing hangers with their upper ends pivotally suspended from said transom and extending downwardly through said ball and socket bearings and hollow wheel pieces and there connected to said brackets to support said body.

12. In a railway vehicle, a truck including side frames with hollow wheel pieces, a transom extending between and provided with ball and socket bearings on said wheel pieces, a body having depending brackets at the outer sides of said wheel pieces, swing hangers with their upper ends pivotally suspended from said transom and extending downwardly through said ball and socket bearings and hollow wheel pieces, levers pivoted on said brackets each having one arm engaging one of said swing hangers and the other arm spring connected to said body.

13. In a railway vehicle, a body including an underframe, a truck including a frame, said underframe and frame being movable relative to each other transversely of the vehicle, and means supporting said underframe on said truck frame comprising a torque rod extending horizontally at the level of said underframe and truck frame, and connections between spaced portions of said rod and said underframe and truck frame respectively, one of said connections comprising a linkage providing for relative transverse movement of said underframe and truck frame.

EINAR G. HALLQUIST.